United States Patent
Kaibin et al.

(10) Patent No.: US 9,397,321 B2
(45) Date of Patent: Jul. 19, 2016

(54) MOLDING PACKAGING MATERIAL, AND MOLDED CASE

(71) Applicant: Showa Denko Packaging Co., Ltd., Isehara-shi, Kanagawa (JP)

(72) Inventors: Zeng Kaibin, Hikone (JP); Susumu Takada, Hikone (JP)

(73) Assignee: Showa Denko Packaging Co., Ltd., Kanagawa (JP)

( * ) Notice: Subject to any disclaimer, the term of this patent is extended or adjusted under 35 U.S.C. 154(b) by 285 days.

(21) Appl. No.: 14/302,449

(22) Filed: Jun. 12, 2014

(65) Prior Publication Data

US 2014/0370368 A1    Dec. 18, 2014

(30) Foreign Application Priority Data

Jun. 17, 2013 (JP) ................................. 2013-126577
Mar. 28, 2014 (JP) .................................. 2014-67677

(51) Int. Cl.
| | |
|---|---|
| *H01M 2/02* | (2006.01) |
| *B32B 7/12* | (2006.01) |
| *B32B 15/08* | (2006.01) |
| *B65D 1/34* | (2006.01) |
| *B65D 1/40* | (2006.01) |
| *B32B 15/20* | (2006.01) |
| *B32B 27/36* | (2006.01) |
| *B32B 27/40* | (2006.01) |

(52) U.S. Cl.
CPC ............. *H01M 2/0287* (2013.01); *B32B 7/12* (2013.01); *B32B 15/08* (2013.01); *B32B 15/20* (2013.01); *B32B 27/36* (2013.01); *B32B 27/40* (2013.01); *B65D 1/34* (2013.01); *B65D 1/40* (2013.01); *B32B 2255/06* (2013.01); *B32B 2255/26* (2013.01); *B32B 2307/518* (2013.01); *B32B 2307/54* (2013.01); *B32B 2307/714* (2013.01); *B32B 2553/00* (2013.01); *Y10T 428/31605* (2015.04)

(58) Field of Classification Search
None
See application file for complete search history.

(56) References Cited

U.S. PATENT DOCUMENTS

| | | | |
|---|---|---|---|
| 2008/0286635 A1 | 11/2008 | Seino et al. | |
| 2009/0202839 A1* | 8/2009 | Uno ................... | C08G 18/4263 428/423.1 |
| 2011/0104546 A1 | 5/2011 | Seino et al. | |

FOREIGN PATENT DOCUMENTS

| | | |
|---|---|---|
| JP | 2000-123800 A | 4/2000 |
| JP | 3567229 B2 | 9/2004 |
| JP | 4380728 B2 | 12/2009 |
| JP | 2011-096552 A | 5/2011 |
| JP | 2011-119269 A | 6/2011 |
| JP | 2011-138793 A | 7/2011 |

* cited by examiner

*Primary Examiner* — Patrick Ryan
*Assistant Examiner* — Wyatt McConnell
(74) *Attorney, Agent, or Firm* — Keating and Bennett, LLP

(57) ABSTRACT

A molding packaging material includes a heat resistant resin layer as an outer layer, a metal foil layer, and a first adhesive agent layer arranged there between. The first adhesive agent layer is constituted by an adhesive agent containing a two-part curing type polyester polyurethane resin made of a polyester resin as a main ingredient and a multifunctional isocyanate compound as a curing agent. The polyester resin is made from dicarboxylic acid and dialcohol, the dicarboxylic acid contains aliphatic carboxylic acid whose number of methylene of a methylene chain is an even number and aromatic carboxylic acid, and a content rate of the aromatic carboxylic acid to a total amount of aliphatic carboxylic acid and aromatic carboxylic acid is 40 to 80 mol %. The polyester resin is 8,000 to 25,000 in number average molecular weight (Mn) and 15,000 to 50,000 in weight average molecular weight (Mw), and a ratio thereof (Mw/Mn) is 1.3 to 2.5.

8 Claims, 5 Drawing Sheets

MOLDING PACKAGING MATERIAL, AND MOLDED CASE

TECHNICAL FIELD

The present invention relates to a molding packaging material and a molded case preferably used as a case for stationary type lithium ion secondary batteries or lithium ion secondary batteries for use in, e.g., laptops, mobile phones, or automobiles, and also preferably used as a packaging material for, e.g., food products or pharmaceutical products.

TECHNICAL BACKGROUND

As a material for a battery case for lithium ion secondary batteries, etc., a packaging material of a multilayered structure is used, in which resin layers are laminated on both surfaces of a metal foil via an adhesion layer.

In manufacturing the packaging material, as a method of bonding the metal foil and the resin layer, a dry laminating method is employed, in which using a two-part curing type adhesive agent made of polyol and isocyanate, after applying the adhesive agent and evaporating the solvent, the metal foil and the resin layer are bonded. In the dry laminating method, after bonding the metal foil and the resin layer, aging is performed at about several tens ° C. for several days to facilitate the curing of the adhesive agent to thereby enhance the adhesive strength (see Patent Documents 1 to 6).

Further, when manufacturing a case using the aforementioned sheet-like packaging material, for the purpose of securing an inner volume of the case, generally, the material is formed into a three-dimensional shape by drawing or bulging.

PRIOR ART DOCUMENTS

[Patent Document 1] Japanese Patent No. 3567229
[Patent Document 2] Japanese Unexamined Laid-open Patent Application Publication No. 2000-123800
[Patent Document 3] Japanese Unexamined Laid-open Patent Application Publication No. 2011-096552
[Patent Document 4] Japanese Patent No. 4380728
[Patent Document 5] Japanese Unexamined Laid-open Patent Application Publication No. 2011-119269
[Patent Document 6] Japanese Unexamined Laid-open Patent Application Publication No. 2011-138793

SUMMARY OF THE INVENTION

Problems to be Solved by the Invention

However, when performing shape forming for further heightening the side wall of the case, i.e., when performing deep forming, there is a risk to cause delamination between the metal foil layer and the outer resin layer, and therefore the forming depth is limited. Further, even in cases where no delamination occurs immediately after forming, when the case is used under sever environment, delamination sometimes occurs.

Means to Solve the Problems

Some preferred embodiments of the present invention was made in view of the aforementioned technical background, and aim to provide a molding packaging material capable of performing deeper molding by preventing detachment of a heat-resistant resin layer as an outer resin layer. That is, some preferred embodiments of the present invention have the structure as recited in the following Items (1) to (8).

(1) A molding packaging material, comprising:
a heat resistant resin layer as an outer layer;
a metal foil layer; and
a first adhesive agent layer arranged between the heat resistant resin layer and the metal foil layer,
wherein the first adhesive agent layer is constituted by an adhesive agent containing a two-part curing type polyester polyurethane resin made of a polyester resin as a main ingredient and a multifunctional isocyanate compound as a curing agent,
wherein the polyester resin is made from dicarboxylic acid and dialcohol, the dicarboxylic acid contains aliphatic carboxylic acid whose number of methylene of a methylene chain is an even number and aromatic carboxylic acid, and a content rate of the aromatic carboxylic acid to a total amount of aliphatic carboxylic acid and aromatic carboxylic acid is 40 to 80 mol %, and
wherein the polyester resin is 8,000 to 25,000 in number average molecular weight (Mn) and 15,000 to 50,000 in weight average molecular weight (Mw), and a ratio thereof (Mw/Mn) is 1.3 to 2.5.

(2) The molding packaging material as recited in Item 1, wherein the two-part curing type polyester polyurethane resin contains the main ingredient and the curing agent at a rate of 2 to 25 mole of isocyanate functional group (—NCO) to 1 mole of polyol hydroxyl group (—OH).

(3) The molding packaging material as recited in Item 1 or 2, wherein the two-part curing type polyester polyurethane resin is 70 to 400 MPa in Young's modulus by a tensile test (JIS K7162) of a cured film obtained after reacting the main ingredient and the curing agent.

(4) The molding packaging material as recited in any one of Items 1 to 3, wherein the multifunctional isocyanate compound as the curing agent contains 50 mol % or more of aromatic series isocyanate.

(5) The molding packaging material as recited in any one of Items 1 to 4, further comprising:
a thermoplastic resin layer as an inner layer; and
a second adhesive agent layer arranged between the metal foil layer and the thermoplastic resin layer,
wherein a chemical conversion coating film is provided on at least one surface of the metal foil layer.

(6) A molded case comprising:
a concave case main body having an opening periphery; and
a flange continuously formed on the opening periphery of the concave case main body,
wherein the concave case main body and the flange are formed by drawing or bulging the molding packaging material as recited in any one of Items 1 to 5.

(7) The molded case as recited in Item 6, wherein the molded case is used as a battery case.

(8) The molded case as recited in Items 6 or (7, wherein a forming depth of the case main body is 3 mm or more, and a radius of curvature R of a shoulder region formed by a side wall of the case main body and the flange is 2 mm or less.

In the embodiment as recited in the aforementioned item (1), since the adhesive agent containing the two-part curing type polyester polyurethane resin of a specific composition is used as a first adhesive agent layer between the heat resistant resin layer and the metal foil layer, the adhesive strength is high and the formability is good. For this reason, even after performing deep forming, the heat resistant resin layer will never be detached.

In each of the embodiment as recited in the aforementioned items (2)(3)(4), the aforementioned effect is especially excellent.

In the embodiment as recited in the aforementioned item (5), since the metal foil layer has, on a surface thereof, a chemical conversion coating film, corrosion of the metal foil can be restrained, and therefore a molding packaging material high in corrosion resistance can be provided.

In the embodiment as recited in the aforementioned item (6), even if deep forming is performed, a molded case in which the heat resistant resin layer will never be detached can be provided.

In the embodiment as recited in the aforementioned item (7), even after performing deep forming, a battery case in which the heat resistant resin layer will never be detached can be provided.

In the embodiment as recited in the aforementioned item (8), even in cases where forming in which the forming depth of the case main body is 3 mm or more is performed or where forming in which the radius of curvature R of the shoulder region of the case main body is equal to or less than 2 mm is performed, a molded case, such as, e.g., a battery case, in which the heat resistant resin layer will never be detached can be provided.

BRIEF DESCRIPTION OF THE DRAWINGS

The preferred embodiments of the present invention are shown by way of example, and not limitation, in the accompanying figures, in which.

EMBODIMENTS FOR CARRYING OUT THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

(Structure of Molding Packaging Material)

Figure 1:
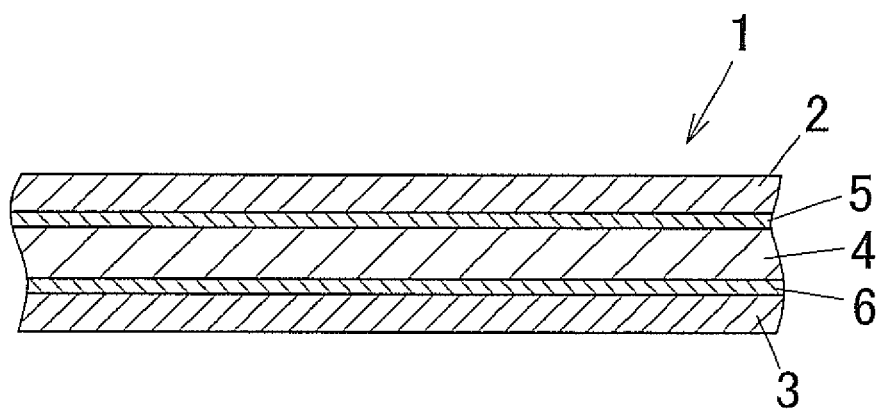
FIG. 1 is a cross-sectional view showing an embodiment of a molding packaging material according to the present invention.

FIG. 1 shows a molding packaging material 1 according to one embodiment of the present invention. This molding packaging material 1 is used as a packaging material for lithium ion secondary battery cases. That is, the molding packaging material 1 is subjected to forming, such as, e.g., deep drawing, and used as a case for secondary batteries.

The molding packaging material 1 has a structure in which a heat resistant resin layer (outer layer) 2 is integrally laminated on the upper surface of the metal foil layer 4 via a first adhesive agent layer 5, and a thermoplastic resin layer (inner layer) 3 is integrally laminated on the lower surface of the metal foil layer 4 via a second adhesive agent layer 6.

Hereinafter, each layer will be detailed.

(Heat Resistant Resin Layer)

The heat resistant resin layer (outer layer) 2 is not especially limited, but, for example, a polyamide film, a polyester film, etc., can be exemplified, and stretched films thereof are preferably used. Among them, as the heat resistant resin layer 2, in terms of formability and strength, it is especially preferable to use a biaxially stretched polyamide film, a biaxially stretched polybutylene terephthalate (PBT) film, a biaxially stretched polyethylene terephthalate (PET) film or a biaxially stretched polyethylene naphthalate (PEN) film. The polyamide film is not especially limited, but a 6 nylon film, a 6,6 nylon film, an MXD nylon film, etc., can be exemplified. It should be noted that the heat resistant resin layer 2 can be formed as a single layer or a multi-layer made of, for example, a PET film/polyamide film.

It is preferable that the thickness of the heat resistant resin layer 2 is 9 μm to 50 μm. When a polyester film is used, it is preferable that the thickness is 9 μm to 50 μm, and when a polyamide film is used, it is preferable that the thickness is 10 μm to 50 μm. Setting the thickness to the preferred lower limit or above allows to secure enough strength as a packaging material. On the other hand, setting the thickness to the preferred upper limit or below enables reduction of stress to be generated at the time of bulging or drawing to thereby improve the formability.

(Thermoplastic Resin Layer)

The thermoplastic resin layer (inner layer) 3 gives excellent chemical resistance against highly corrosive electrolyte, etc., used for, e.g., lithium ion secondary batteries and plays the role of providing heat seal characteristics to the packaging material.

The thermoplastic resin layer 3 is not especially limited, but it is preferable to be a thermoplastic resin non-stretched film layer. The thermoplastic resin non-stretched film layer is not especially limited, but in terms of chemical resistance and heal sealing characteristics, it is preferable to be constituted by a non-stretched film made of at least of one of thermoplastic resins selected from the group consisting of polyethylene, polypropylene, olefin-based copolymer, and acid-modified resins thereof and ionomers.

It is preferable that the thickness of the heat resistant resin layer 3 is set to 20 μm to 80 μm. When it is set to 20 μm or more, formation of pinholes can be sufficiently prevented, and when it is set to be 80 μm or less, the resin consumption can be reduced, thereby making cost reduction possible. Among them, it is especially preferable that the thickness of the heat resistant resin layer 3 is set to 30 μm to 50 μm. It should be noted that the thermoplastic resin layer 3 can be a single-layer or a multi-layer. As the multi-layer film, a three-layer film, in which random polypropylene films are laminated on both surfaces of a block polypropylene film, can be exemplified.

(Metal Foil Layer)

The metal foil layer 4 plays the role of giving gas barrier characteristics to prevent intrusion of oxygen and/or moisture to the molding packaging material 1. The metal foil layer 4 is not especially limited, but, for example, an aluminum foil, a copper foil, a stainless steel foil, etc., can be exemplified, and an aluminum foil is generally used. It is preferable that the thickness of the metal foil layer 4 is 20 μm to 100 μm. Setting the thickness to 20 μm or more enables prevention of formation of pinholes during rolling when manufacturing the metal foil. On the other hand, setting the thickness to 100 μm or less enables reduction of stress to be generated at the time of bulging or drawing to thereby improve the formability.

(First Adhesive Agent Layer)

The first adhesive agent layer 5 is a layer that joins the metal foil layer 4 and the heat resistant resin layer 2 as the outer layer, and is constituted by an adhesive agent containing a two-part curing type polyester polyurethane resin made of a polyester resin as a main ingredient and a multifunctional isocyanate compound as a curing agent.

The polyester resin is a copolymer made of dicarboxylic acid and dialcohol as raw materials. In the present invention, by specifying types and compositions of the dicarboxylic acid and the dialcohol as raw materials and specifying the molecular weight of the polyester resin, adhesive strength and formability are enhanced to thereby prevent possible delamination at the time of performing deep drawing.

As the dicarboxylic acid, both aliphatic dicarboxylic acid and aromatic dicarboxylic acid are used. The odd-even of the number of methylene of the methylene chain of the aliphatic dicarboxylic acid is a factor that exerts an influence on the crystalline of resin, and dicarboxylic acid having an even number of methylene generates a resin high in crystalline. In the present invention, aliphatic dicarboxylic acid having an even number of methylene is used. As aliphatic dicarboxylic acid having an even number of methylene, succinic acid (number of methylene: 2), adipic acid (number of methylene: 4), suberic acid (number of methylene: 6), and sebacic acid (number of methylene: 8) can be exemplified. By using these dicarboxylic acids, a resin high in adhesive strength and excellent in formability can be created, which enables molding into a case excellent in formability and high in side walls and also enables providing a molding packaging material capable of controlling delamination of the metal foil layer 4 and the heat resistant resin layer 2.

Further, by setting the content rate of the aromatic dicarboxylic acid with respect to the total amount of aliphatic dicarboxylic acid and aromatic dicarboxylic acid so as to fall within the range of 40 to 80 mol %, in other words, by keeping the content rate of aliphatic dicarboxylic acid within the range of 20 to 60 mol %, it becomes possible to create a resin high in adhesive strength. This results in a molding packaging material which is excellent in formability and is capable of forming into a case having high side walls and also capable of controlling the possible delamination of the metal foil layer 4 and the heat resistant resin layer 2. If the content rate of the aromatic dicarboxylic acid is less than 40 mol %, the film properties decrease and cohesion detachments become more likely to occur, and therefore delamination is more likely to occur. On the other hand, if the content rate of the aromatic dicarboxylic acid exceeds 80%, there is a tendency for resin to harden, thereby decreasing adhesiveness. An especially preferable content rate of aromatic dicarboxylic acid is 50 to 70 mol %. As concrete examples of the aromatic dicarboxylic acid, isophthalic acid, terephthalic acid, naphthalenedicarboxylic acid, and phthalic anhydrite can be exemplified.

As the dialcohol, ethylene glycol, propylene glycol, 1,3 butanediol, 1,4-butanediol, diethylene glycol, dipropylene glycol, neopentyl glycol, 1,5-pentanediol, 1,6-hexanediol, octanediol, 1,4-cyclohexanediol, 2-butyl-2-ethyl-1, and 3-propanediol can be exemplified.

For the molecular weight of the polyester resin, the number average molecular weight (Mn) is set within the range of 8,000 to 25,000 and the weight average molecular weight (Mw) is set within the range of 15,000 to 50,000 and furthermore, their ratio (Mw/Mn) is set to 1.3 to 2.5. When the number average molecular weight (Mn) is 8,000 or more and the weight average molecular weight (Mw) is 15,000 or more, proper coating strength and heat resistance can be obtained. By setting the number average molecular weight (Mn) to 25,000 or less and the weight average molecular weight (Mw) to 50,000 or less, excessive hardening does not occur and a proper film elongation can be obtained. Also, when their ratio (Mw/Mn) is 1.3 to 2.5, molecular weight distribution becomes appropriate and the balance between adhesive agent application suitability (distribution is wide) and performance (distribution is small) can be maintained. For the polyester resin, the especially preferable number average molecular weight (Mn) is 10,000 to 23,000 and the especially preferable weight average molecular weight (Mw) is 20,000 to 40,000 and the especially preferable ratio (Mw/Mn) is 1.5 to 2.3.

The molecular weight of the polyester resin can be adjusted by chain elongation of multifunctional isocyanate. That is, when the polyester component in the main ingredient is linked with NCO, a polymer having a hydroxyl group terminal is generated at the end, and the molecular weight of the polyester resin can be adjusted by adjusting the equivalent ratio of the isocyanate group and the hydroxyl group of polyester. In the present invention, it is preferable to use the polyester resin in which OH and NCO is linked so that the equivalent ratio (OH/NCO) becomes 1.01 to 10. Further, as another molecular weight adjustment method, a change of the reaction condition of the polycondensation reaction of the dicarboxylic acid and the dialcohol (adjustment of the combination molar ratio of the dicarboxylic acid and the dialcohol) can be exemplified.

Furthermore, an epoxy based resin or an acrylic resin can be added as an additive agent of an adhesion main ingredient.

As the multifunctional isocyanate compound as the curing agent, various isocyanate compounds of aromatic, aliphatic, and alicyclic system can be used. As examples, multifunctional modified isocyanate of one or two or more types of aliphatic hexamethylene diisocyanate (HDI), isophorone diisocyanate (IPDI), or aromatic tolylene diisocyanate (TDI), diphenyl methane diisocyanate (MDI), etc. can be exemplified. As a modifying means, other than adduct bodies with multifunctional active hydrogen compound such as water, glycerin and trimethylolpropane, multifunctional modified isocyanate by many quantification reactions such as isocyanurate, carbodiimide, and polymeric, etc., can be exemplified, and one or two or more types of them can be used in a mixed manner. In the case of using two or more types of isocyanate compounds in a mixed manner, in order to increase the adhesive strength after curing to obtain the detachment prevention effect of the heat resistant resin layer 2, it is preferable that 50 mol % or more aromatic isocyanate compound is contained in the curing agent. An especially preferable content rate of aromatic isocyanate compound is 70 mol % or more.

In the two-part curing type polyester polyurethane resin, the combination ratio of the main ingredient and the curing agent is preferably a ratio of 2 to 25 mol of the isocyanate-functional group (—NCO) mixed for 1 mol of polyol hydroxyl group (—OH). If the molar ratio (—NCO)/(—OH) is less than 2 and the isocyanate functional group (—NCO) is reduced, sufficient hardening reaction does not occur and there is a risk that proper coating strength and heat resistance cannot be obtained. On the other hand, if (—NCO)/(—OH) exceeds 25 and the isocyanate functional group (—NCO) increases, the reaction with the functional group other than the polyol progresses too much, thereby hardening the coating and there is a risk that a proper elongation cannot be obtained. An especially preferable molar ratio (—NCO)/(—OH) of the polyol hydroxyl group and the isocyanate functional group is 5 to 20.

Figure 2:
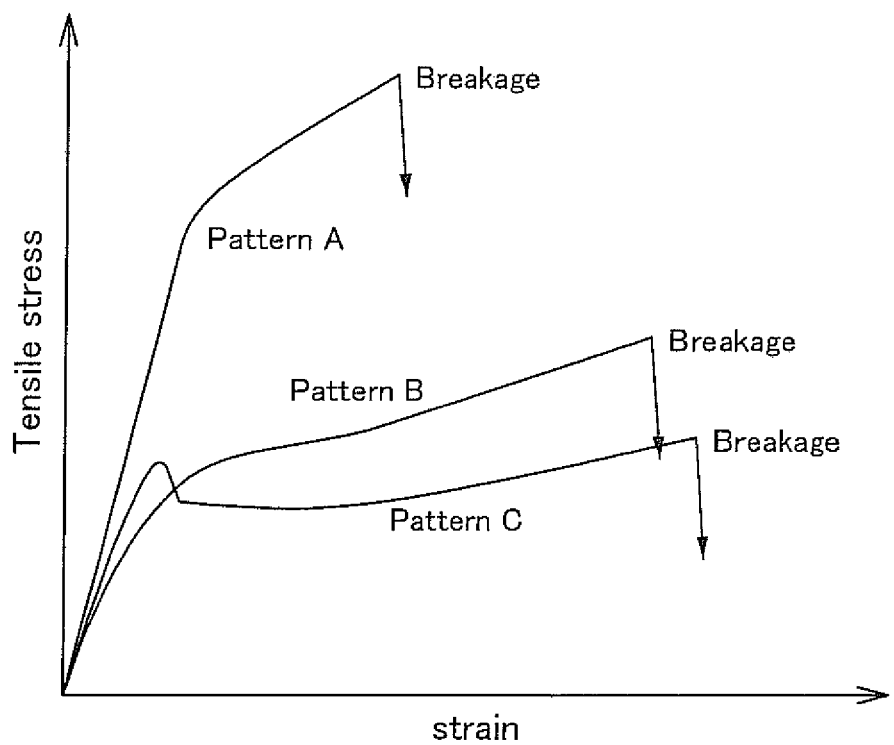
FIG. 2 is an S-S curve diagram of a cured film of a two-part curing type adhesive agent.

For the two-part curing type polyester polyurethane resin, to obtain good formability of the molding packaging material 1 and bond strength between the layers, it is preferable that Young's modulus by the tensile test (JIS K7162) of the physical properties of the cured film after reaction is 70 to 400 MPa. An especially preferable Young's modulus is 100 to 300 MPa. Also, it is preferable that the break strength is 20 to 70 MPa and the breaking elongation is 50 to 400%. Especially preferable break strength is 30 to 50 MPa and especially preferable breaking elongation is 100 to 300%. Furthermore, it is preferable that the tensile stress-strain curve (S-S curve) does not show a strength reduction before breaking. FIG. 2 shows three patterns of the S-S curve. The pattern A has a small strain amount for the tensile stress and the pattern B has a large strain amount for the tensile stress, but in either case, the strain amount increases along with the increase in the tensile strength, and no strength reduction before breaking is present. On the other hand, in pattern C, the tensile strength is reduced in the course of increase of strain amount, and shows strength reduction before breaking. In the present invention, it is preferable that the cured film of the two-part curing type adhesive agent does not show strength reduction in the S-S curve. It is more preferable that there is no flexure point in the S-S curve, in which the strength changes rapidly.

The adhesive agent including the two-part curing type polyester polyurethane resin subjects the dicarboxylic acid and the dialcohol as the ingredients of polyester resin to condensation polymerization, and as needed, performs chain elongation with a multifunctional isocyanate, forms a floating polyester resin solution by mixing various additives, such as, e.g., solvent, urethanization reaction catalyst, a coupling agent for improving adhesive strength, an epoxy resin, an antifoaming agent, a leveling agent, ultraviolet rays absorbent, and antioxidants, and further adds a multifunctional isocyanate compound as a curing agent or a solvent to prepare a low viscosity fluid material. The adhesion method of the metal foil layer 4 and the heat resistant resin layer 2 is not limited, but a method called "dry lamination" can be suggested. Specifically, the prepared adhesive agent is applied to the upper surface of the metal foil layer 4, the lower surface of the heat resistant resin layer 2, or both of those surfaces, and after the solvent has evaporated and the film became dry, the metal foil layer 3 and the heat resistant resin layer 2 are adhered. Thereafter, it is hardened according to the hardening condition of the two-part curing type polyester polyurethane resin. In this way, the metal foil layer 4 and the heat resistant resin layer 2 are joined via the first adhesive agent layer 5. As the application method of the adhesive agent, a gravure coat method, a reverse roll coat method, and a lip roll coat method, etc., can be exemplified.

It is preferable that the thickness after curing the first adhesive agent layer 5 is within the range of 0.1 to 10 μm. By setting the thickness to 0.1 μm or more, adhesive strength can be secured, and by setting the thickness to 10 μm or less, good formability can be attained and it becomes possible to sufficiently prevent the first adhesive agent layer 5 from partially breaking.

(Second Adhesive Agent Layer)

The second adhesive agent layer 6 is not especially limited, but for example, an adhesive agent layer formed by a polyurethane-based adhesive agent, an acrylic adhesive agent, an epoxy-based adhesive agent, a polyolefin-based adhesive agent, an elastomer-based adhesive agent, a fluorine-based adhesive agent, and an acid-modified polypropylene adhesive agent can be exemplified. Among them, it is preferable to use the acrylic adhesive agent and the polyolefin-based adhesive agent, and in that case, the electrolyte characteristics resistance and the water vapor barrier characteristics of the packaging material 1 can be improved.

Although the bonding method of the metal foil layer 4 and the thermoplastic resin layer 3 is not limited, similarly to the aforementioned bonding of the metal foil layer 4 and the heat resistant resin layer 2, the dry laminating method can be exemplified, in which the bonding is performed after applying and drying an adhesive agent constituting the second adhesive agent layer.

(Manufacturing Molding Packaging Material)

The heat resistant resin layer 2 is bonded to the upper surface of the metal foil layer 4 using the aforementioned dry laminating method and the thermoplastic resin layer 3 is bonded to the lower surface using the dry laminating method to form a laminate. By maintaining it at a predetermined temperature according to the hardening condition of the adhesive agent using the laminate, the heat resistant resin layer 2 and the thermoplastic resin layer 3 are joined via the first adhesive agent layer 5 and the second adhesive agent layer 6, respectively, to prepare the molding packaging material 1.

For the molding packaging material of the present invention, the bonding method and the bonding steps of each layer is not limited to the aforementioned methods and steps, and the present invention includes cases in which other methods and steps are used for the preparation.

In addition, the present invention does not limit the bonding method of the thermoplastic resin layer 3 as the inner layer and the metal foil layer 4, and the bonding via the second adhesive agent layer 6 is merely one example.

[Other Embodiments of Molding Packaging Material]

The molding packaging material of the present invention is not limited to the laminate structure shown in FIG. 1. As long as the heat resistant resin layer 2 as the outer layer and the metal foil layer 4 are adhered by the first adhesive agent layer 5 having the aforementioned composition, the laminate structure of the inner layer and the ingredients constituting them are not limited. Also, layers can be added to the packaging material to improve the function. In the molding packaging material 10 shown in FIG. 3, chemical conversion coating films 11a and 11b are formed on both sides of the metal foil layer 4.

(Chemical Conversion Coating Film of Metal Foil Layer)

The outer layer and the inner layer of the molding packaging material are layers made of resin, and there is a risk that, although it is infinitesimal, light, oxygen and liquid may enter these resin layers from the outside of the case, and contents, such as, e.g., electrolyte, food products, and pharmaceutical products, etc., may infiltrate from the inside. When these invasion objects reach the metal foil layer, it becomes the cause of corrosion of the metal foil layer. In the molding packaging material of the present invention, by forming highly corrosion resistant chemical conversion coating films 11a and 11b on the surface of the metal foil layer 4, the corrosion resistance of the metal foil layer 4 can be improved.

The chemical conversion coating film is a film formed by subjecting the metal foil surface to a chemical conversion treatment, and for example, it can be formed by subjecting the metal foil to a chromate treatment, a non-chromic model chemical conversion treatment using a zirconium compound. For example, in the case of the chromate treatment, after a water solution having any of the following mixtures 1 to 3 described below is applied to the metal foil surface subjected to a degreasing processing, it is dried.

1) A mixture of phosphoric acid, chromic acid, and at least one of metal salt of fluoride and on-metal salt of fluoride 2) A mixture of phosphoric acid, any one of acrylic resin, chitosan derivative resin, and phenolic resin, and at least one of chromic acid or chromium (III) sulfate 3) A mixture of phosphoric acid, any one of acrylic resin, chitosan derivative resin, and phenolic resin, and at least one of chromic acid or chromium (III) sulfate, and at least one of metal salt of fluoride or non-metal salt of fluoride For the chemical conversion coating films 11a and 11b, a quantity of chromic adhesion of 0.1 to 50 mg/m$^2$ is preferable, and 2 to 20 mg/m$^2$ is especially preferable. From a chemical conversion coating film having the thickness and the quantity of chromic adhesion, a highly corrosion resistant molding packaging material can be obtained.

Figure 3:
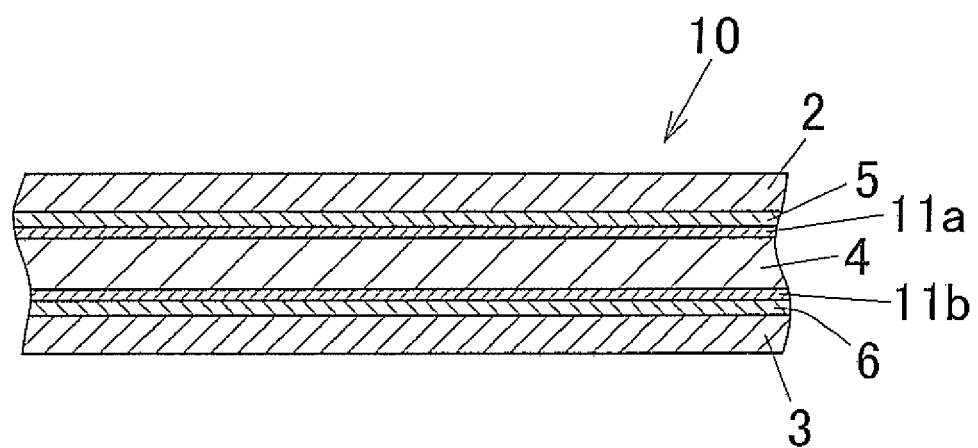
FIG. 3 is a cross-sectional view showing another embodiment of a molding packaging material according to the present invention.

In addition, the molding packaging material 10 of FIG. 3 is an example in which the chemical conversion coating films 11a and 11b are formed on both sides of the metal foil layer 4, but a packaging material having the chemical conversion coating film on one of the surfaces is included in the present invention.

(Molded Case)

Figure 4A:
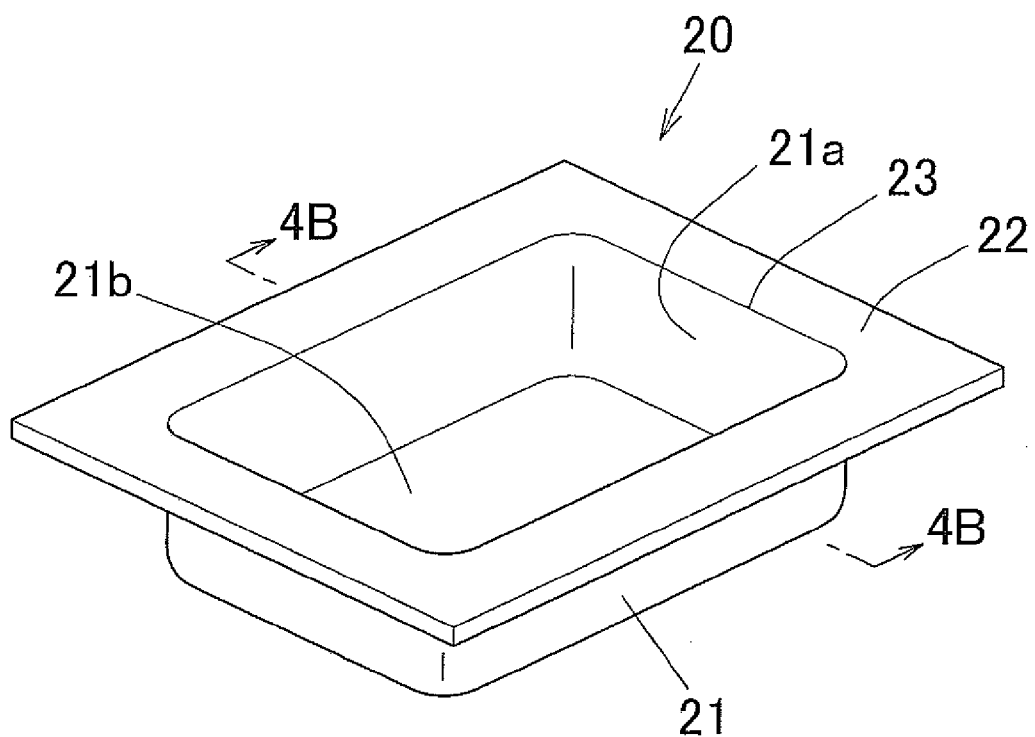
FIG. 4A is a cross-sectional view showing an embodiment of a molded case according to the present invention.
Figure 4B:
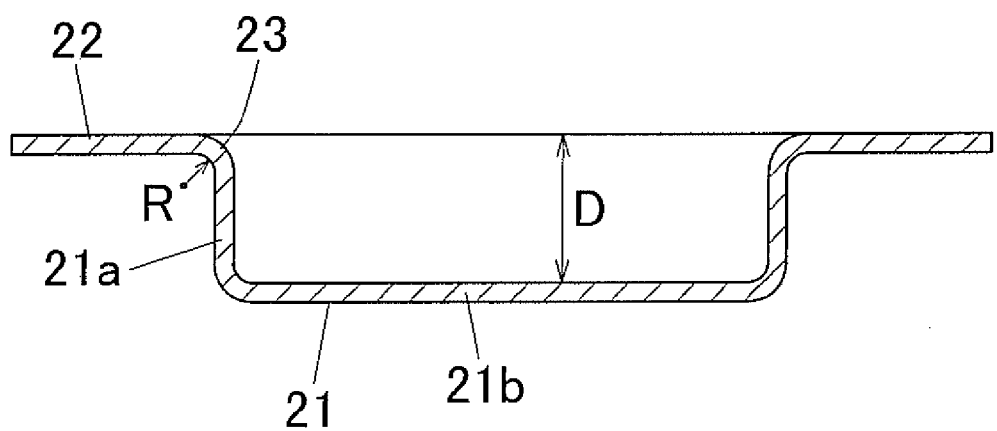
FIG. 4B is a cross-sectional view taken along the line 4B-4B in FIG. 4A.

FIGS. 4A and 4B are examples of the molded case according to the present invention. The molded case 20 is a three-dimensional shape case having a rectangular dented-shape case main body 21 having a side wall 21a and a bottom wall 21b and a flange 22 formed outwardly extending from the opening periphery of the case main body 21, and is used as a battery case, for example. The molded case 20 can be obtained by subjecting the molding packaging material of the present invention to drawing, bulging, etc.

Figure 5:
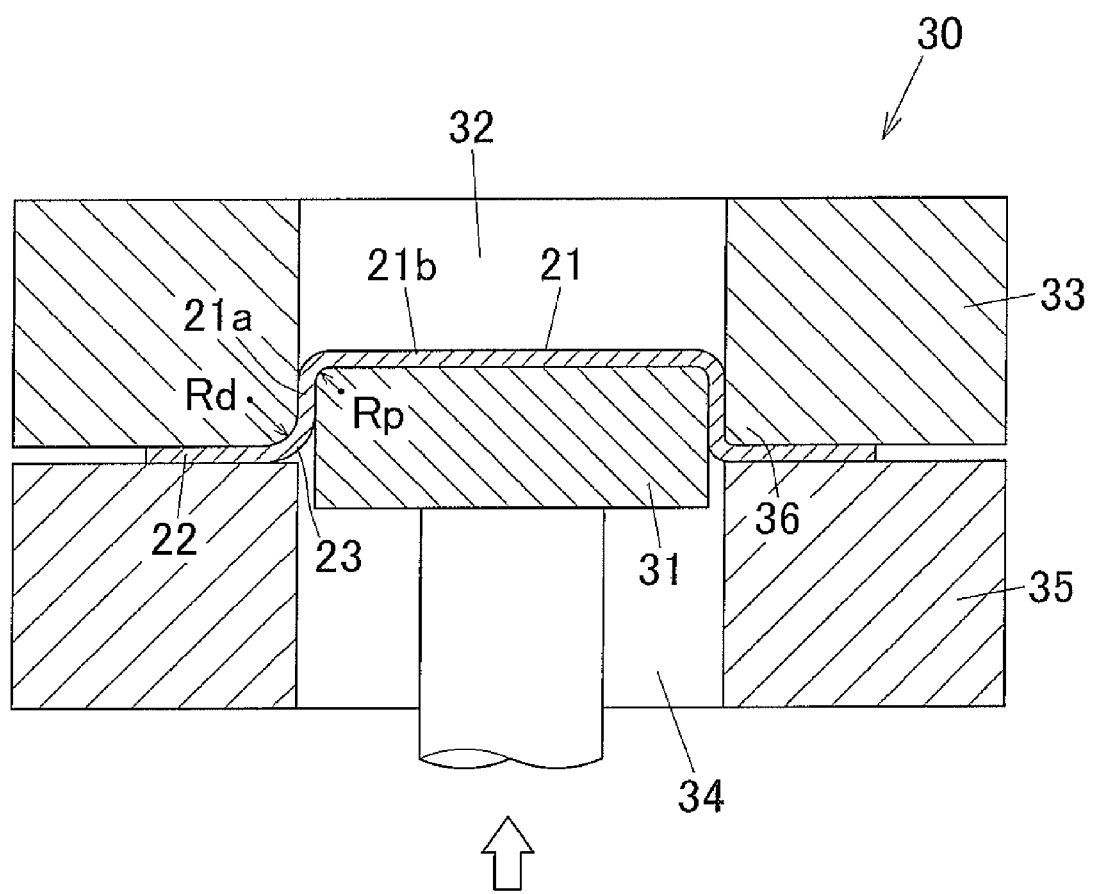
FIG. 5 is a cross-sectional view showing a molding method of the molded case of FIG. 4A.

FIG. 5 is a cross-sectional view showing the molding method of the molded case 20 using a die 30 for drawing, and shows the steps to form a flat molding packaging material into a three-dimensional shape. The die 30 includes a punch 31 for shaping the inner surface shape of the rectangular case main body 21 by pushing in the molding packaging material, a die 33 having a rectangular hole 32 into which the molding packaging material pushed into the punch 31 flows, and a rectangular hole 34 having the same measurements as the hole 32 of the die 33, and is equipped with a blank holder 35 that holds the molding packaging material around the holes 32 and 34. Drawing is a processing method in which the molding packaging material is pushed into the hole 32 of the die 33 and the flange portion of the ingredient is pulled into the hole 32 by the tension from the punch 31 to form the side wall 21a, and the portion pulled into the hole 32 becomes the case main body 21 and the portion sandwiched by the die 33 and the blank holder 35 is the flange 22.

In the molded case 20, to secure the volume inside the case, it is desired that the radius of curvature (R) of the shoulder region 23 is small, the side wall 21a of the case main body 21 is high, that is, the forming depth (D) of the case main body 21 is deep. On the other hand, in forming the molded case 20, the largest stress is generated during forming at the flange 22 and the shoulder region 23, which is the border region of the side wall 21a of the case main body 21. Also, in the molded case 20, the portion in which the heat resistant resin layer 2 is most likely to detach is the shoulder region 23 where the most stress was generated during forming. The stress occurring at the shoulder region 23 increases as the radius of curvature (R) decreases and increases as the forming depth (D) increases. Therefore, the desired case shape is a shape in which detachment is likely to occur at the shoulder region 23.

As shown in FIG. 4B, the radius of curvature (R) of the shoulder region 23 of the molded case 20 in the present invention is the radius of curvature of the outer surface of the case.

The molding packaging material of the present invention has a property in which the heat resistant resin layer is unlikely to detach, so it is suitable as the material of the molded case having a small radius of curvature (D) and a deep forming depth (D) of the shoulder region 23. Specifically, as shown in FIG. 4B, it is suitable as the material of a molded case in which the radius of curvature (R) is 2 mm or less and the forming depth (D) of the case main body 21 is 2 mm or more. An especially significant application of the radius of curvature (R) of the shoulder region 23 is 1 mm or less. Also, an especially significant and preferable forming depth (D) is 3 to 20 mm and an especially preferable forming depth (D) is 4 to 10 mm.

Also, as shown in FIG. 5, in the radius of curvature (R) of the shoulder region 23 of the molded case 20, since the shoulder region 36 of the die 33 used for forming, that is, the radius of curvature (Rd) of the external corners formed by the upper surface of the die 33 and the side wall of the hole 34 is reflected, the shape of the shoulder region 23 of the molded case 20 can be designed using the shape of the shoulder region 36 of the die 33.

EXAMPLES

Next, although concrete examples of the present invention will be explained, it should be noted that the present invention is not specifically limited to these Examples.

In the following Examples 1 to 6 and Comparative Examples 1 to 6, molding packaging materials 10 each having the laminate structure shown in FIG. 3 were produced. These were different only in the composition of the first adhesive agent layer 5 and common in the other materials. Common materials were as follows.

The metal foil layer 4 was an aluminum foil 4 having a thickness of 35 μm, and chemical conversion treatment liquid of polyacrylic acid, trivalent chrome compound, water and alcohol was applied on both surfaces of the aluminum foil and dried at 180° C. to thereby obtain chemical conversion films 11a and 11b. The quantity of chromic adhesion by this chemical conversion coating films 11a and 11b was 10 mg/m$^2$.

The heat resistant resin layer 2 as an outer layer was a biaxially stretched nylon film having a thickness of 25 μm and the thermoplastic resin layer 3 as an inner layer was a non-stretched polypropylene film having a thickness of 30 μm. As the second adhesive agent layer 6, polyacrylic adhesive agent was used.

Example 1

Initially, polyester resin (polyester polyol) as a main ingredient of a two-part curing type polyester polyurethane resin agent was prepared. As the main ingredient, 30 pts·mol of neopentylglycol, 30 pts·mol of ethylene glycol, and 40 pts·mol of 1,6-hexanediol were molten at 80° C., and while stirring them, the polyester polyol was obtained by the polyo-condensation reaction of 30 pts·mol of adpic acid (number of methylene: 4) as aliphatic dicarboxylic acid and 70 pts·mol of isophthalic acid as aromatic dicarboxylic acid at 210° C. for 20 hours. The number average molecular weight (Mn) of the polyester polyol was 12,000, the weight average molecular weight (Mw) thereof was 20,500, and the ratio thereof (Mw/Mn) was 1.71. Further, 60 pts·mass of ethyl acetate was added to 40 pts·mass of the polyester polyol to obtain a fluidized polyester resin solution having a viscosity of 500 mPa·S/25° C. Further, the hydroxyl group value was 2.2 mg KOH/g (solution level).

A polyester polyurethane resin adhesive agent was obtained by mixing 13 pts·mass of a multifunctional isocyanate compound (NCO %: 13.0%, solid content: 75%) in which 100% of tolylene diisocyanate (TDI) of an adduct body of tolylene diisocyanate (TDI) and trimethylol propane which was an aromatic isocyanate compound as a curing agent, further mixing 86 pts·mass of ethyl acetate and stirring them.

In the main ingredient composition, the content rate (mol %) of aromatic carboxylic acid to the total amount of dicarboxylic acid and the content rate (mol %) of each dialcohol to the total amount of dialcohol were as shown in Table 1. Further, the molar ratio (—NCO)/(—OH) of the isocyanate functional group(—NCO) and polyester polyolhydroxyl group(—OH) was 10.

Next, the two-part curing type polyester polyurethane resin adhesive agent was applied on one of the surfaces of the aluminum foil 4 on both of which the chemical conversion coating films 11a and 11b were formed and dried to thereby form a first adhesive agent layer 5. The weight of the first adhesive agent layer 5 after being dried was 3.5 g/m² and the thickness thereof was 5 μm. On the first adhesive agent layer 5, a heat resistant resin layer 2 was adhered. On the other hand, on the other surface of the aluminum foil 4, polyacylic adhesive agent was applied and dried to form a second adhesive agent layer 6, and a thermoplastic resin layer 3 was adhered on the second adhesive agent layer 6. This laminated member was left under the environment of 40° C. for 5 days to obtain a molding packaging material 10 shown in FIG. 3.

Example 2

In the same manner as in Example 1, the molding packaging material 10 as a main ingredient material shown in FIG. 3 was obtained except that the concentrate of aromatic carboxylic acid (isophothalic acid) to a total amount of dicarbocylic acid was set to 60 mol %.

Example 3

In the same manner as in Example 1, the molding packaging material 10 as a main ingredient material shown in FIG. 3 was obtained except that the concentrate of aromatic carboxylic acid (isophothalic acid) to a total amount of dicarbocylic acid was set to 50 mol %.

Example 4

In the same manner as in Example 1, the molding packaging material 10 as a main ingredient material shown in FIG. 3 was obtained except that the concentrate of aromatic carboxylic acid (isophothalic acid) to a total amount of dicarbocylic acid was set to 40 mol %.

Example 5

Using the same starting material as in Example 1, with the compounding shown in Table 1, polyester polyols different in molecular weight were obtained by adjusting the combination molar ratio of the total amount of diol component to the total amount of dicarboxylic acid so as to be larger than that in Example 1. The number average molecular weight (Mn) of this polyester polyol was 8,900, the weight average molecular weight (Mw) was 15,000, and Mw/Mn was 1.69. The molding packaging material 10 shown in FIG. 3 was obtained in the same manner as in Example 1 except that the molar ratio (—NCO)/(—OH) of polyester polyol hydroxyl group (—OH) and curring agent NCO group was set to 5.

Example 6

Using the same starting material as in Example 1, with the compounding shown in Table 1, polyester polyols different in molecular weight were obtained by adjusting the combination molar ratio of the total amount of diol component to the total amount of dicarboxylic acid so as to be smaller than that in Example 1. The number average molecular weight (Mn) of this polyester polyol was 25,000, and the weight average molecular weight (Mw) was 50,000, and Mw/Mn was 2.00. The molding packaging material 10 shown in FIG. 3 was obtained in the same manner as in Example 1 except that the molar ratio (—NCO)/(—OH) of polyester polyol hydroxyl group (—OH) and curing agent NCO group was set to 20.

Example 7

The molding packaging material 10 shown in FIG. 3 was obtained in the same manner as in Example 1 except for using a multifunctional isocyanate compound (NCO %:13.0%, solid content: 75%) which was an adduct body of tolylene diisocyanate (TDI), hexamethylenediisocyanate (HDI), and trimethylol propane in which diisocyanate component of the curing agent of Example 1 was changed to 80 mol % of aromatic tolylene diisocyanate (TDI) and 20 mol % of hexamethylene diisocyanate (HDI) which was an aliphatic isocyanate compound.

Example 8

The molding packaging material 10 shown in FIG. 3 was obtained in the same manner as in Example 1 except that the compounding ratio of the main ingredient and the curing agent was set to 20 of the molar ratio (—NCO)/(—OH).

Comparative Example 1

In the same manner as in Example 1, the molding packaging material 10 shown in FIG. 3 was obtained except that the aliphatic carboxylic acid as a main ingredient material was changed to azelaic acid 7 in number of methylene.

Comparative Example 2

In the same manner as in Example 1, the molding packaging material 10 as a main ingredient material shown in FIG. 3 was obtained except that the concentrate of aromatic carboxylic acid (isophothalic acid) to a total amount of dicarbocylic acid was set to 30 mol %.

Comparative Example 3

In the same manner as in Example 1, the molding packaging material 10 as a main ingredient material shown in FIG. 3 was obtained except that the concentrate of aromatic carboxylic acid (isophothalic acid) to a total amount of dicarbocylic acid was set to 90 mol %.

Comparative Example 4

Using the same starting material as in Example 1, polyester polyols different in molecular weight were obtained by adjusting the combination molar ratio of the total amount of diol component to the total amount of dicarboxylic acid so as to be larger than that in Comparative Example 1. The number average molecular weight (Mn) of this polyester polyol was 6,700, and the weight average molecular weight (Mw) was 8,400, and Mw/Mn was 1.25. The molding packaging material 10 shown in FIG. 3 was obtained in the same manner as in Example 1 except that the molar ratio (—NCO)/(—OH) of polyester polyol hydroxyl group (—OH) and curring agent NCO group was set to 4.

Comparative Example 5

Using the same starting material as in Comparative Example 1, polyester polyols different in molecular weight were obtained by adjusting the combination molar ratio of the total amount of diol component to the total amount of dicarboxylic acid so as to be smaller than that in Comparative Example 1. The number average molecular weight (Mn) of this polyester polyol was 26,000, and nd the weight average molecular weight (Mw) was 66,000, and Mw/Mn was 2.54. The molding packaging material 10 shown in FIG. 3 was obtained in the same manner as in Comparative Example 1 except that the molar ratio (—NCO)/(—OH) of polyester polyol hydroxyl group (—OH) and curring agent NCO group was set to 23.

Comparative Example 6

The molding packaging material 10 shown in FIG. 3 was obtained in the same manner as in Comparative Example 1 except that the diisocyanate component of the curing agent of Comparative Example 1 was changed to a multifunctional isocyanate compound (NCO %:13.0%, solid content: 75%) which was an adduct body of hexamethylene diisocyanate (HDI) 100%, which was an aliphatic isocyanate compound, and trimethylol propane. The details of the adhesive agent used in each Example are shown in Table 1.

About each molding packaging material obtained as mentioned above, an evaluation was made based on the following evaluation method. These results are shown in Table 1.

(Evaluation Method of Existence or Non-Existence of Delamination)

The produced molding packaging material was cut into 110 mm×180 mm to obtain a molding material. The molding material was subjected to deep drawing using a die shown in FIG. 5 to thereby manufacture square battery cases 20 as shown in FIGS. 4A and 4B under different molding conditions.

The die 30 was a straight die free in molding height. Two kinds of dies 33 different in size were used. The two different kinds of dies 33 were common in that the plane size of the hole 32 was 60 mm in long side and 45 mm in short side and the radius of curvature of each four corner of the hole 32 was 2 mm, and were different only in the radius of curvature (Rd) of the shoulder region 36. The radii of curvature (Rd) of the shoulder regions 36 were 1 mm and 2 mm. The punch 31 and the blank holder 35 were common, and the radius of curvature (Rp) of the shoulder portion of the punch 31 was 1 mm.

In the die 30, using two kinds of dies 33, deep drawings were performed in a state in which the inner thermoplastic resin layer 3 was in contact with the punch to thereby manufacture battery cases 20 which were 3 mm and 5 mm in forming depth (D). That is, on each Example of the molding material, battery cases 20 of four different shapes were manufactured. Since the radius of curvature (R) of the shoulder region 23 of the battery case 20 was equal to the radius of curvature (Rd) of the shoulder region 36 of the die 33, the sizes of the four kinds of cases were R: 2 mm×D: 3 mm, R: 2 mm×D: 5 mm, R: 1 mm×D: 3 mm, and R: 1 mm×D: 5 mm.

The manufactured battery case was put in a dryer set to 90° C., and taken out after three hours had passed. Then, the existence or non-existence of delamination of the heat resistant resin layer 2 was investigated by a visual observation to thereby perform the evaluation based on the following evaluation standard.

○: No delamination occurred
x: Delamination occurred (Physicality of Cured Film)

Creating a cured film of the two-part curing type polyester polyurethane resin adhesive agent used in Example 1, the physicality thereof was evaluated.

The two-part curing type polyester polyurethane resin adhesive agent was applied on the non-adhesive non-processed PP film so that the thickness after drying becomes 50 μm. After drying the solvent, aging was performed until the residual isocyanate became 5% or below at 60° C. to cure it. The cured film was detached from the non-processed PP film and cut into 15 mm width to obtain a test piece.

The obtained test piece was subjected to a tensile test under the conditions of the gauge length of 50 mm and the pulling speed of 200 mm/min. As a result, the Young's modulus was 140 MPa, the break strength was 30 MPa, and the breaking elongation was 300%.

Further, the S-S curve of the tensile test was obtained. The pattern was Pattern A shown in FIG. 2.

As to Examples 2 to 8 and Comparative Examples 1 to 6, in the same manner as mentioned above, cured films were created and the physicality thereof was evaluated. The results are shown in Table 1.

TABLE 1

| | | | | Example | | | | | | | |
|---|---|---|---|---|---|---|---|---|---|---|---|
| | | | | 1 | 2 | 3 | 4 | 5 | 6 | 7 | 8 |
| First adhesive agent layer (Two-part curing type polyester polyurethane resin) | Main ingredient (Polyester resin) | Dicarboxylic acid | Aliphatic (number of methylene) | | | | Adipic acid (4) | | | | |
| | | | Aromatic group | | | | Isophthalic acid | | | | |
| | | | Content rate of Aromatic group (Mol %) | 70 | 60 | 50 | 40 | 70 | 70 | 70 | 70 |
| | | Dialcohol | Neopentylglycol (Mol %) | 30 | 30 | 30 | 30 | 30 | 30 | 30 | 30 |
| | | | Ethylene glycol (Mol %) | 30 | 30 | 30 | 30 | 30 | 30 | 30 | 30 |
| | | | Hexanediol (Mol %) | 40 | 40 | 40 | 40 | 40 | 40 | 40 | 40 |
| | | Molecular weight | Number average molecular weight | 12,000 | 12,000 | 12,000 | 12,000 | 8,900 | 25,000 | 12,000 | 12,000 |

TABLE 1-continued

|  |  |  |  |  |  |  |  |  |  |  |
|---|---|---|---|---|---|---|---|---|---|---|
|  |  | Weight average molecular weight | 20,500 | 20,500 | 20,500 | 20,500 | 15,000 | 50,000 | 20,500 | 20,500 |
|  |  | Mw/Mn | 1.71 | 1.71 | 1.71 | 1.71 | 1.69 | 2.00 | 1.71 | 1.71 |
| Curing agent | Type of Isocyanate compound | | TDI | TDI | TDI | TDI | TDI | TDI | TDI | TDI |
|  | Ration of aromatic group | | 100% | 100% | 100% | 100% | 100% | 100% | 80% | 100% |
| Molar ratio | | | 10 | 10 | 10 | 10 | 5 | 20 | 10 | 20 |
| Young's modulus (MPa) of Hardened film | | | 140 | 120 | 90 | 70 | 100 | 400 | 120 | 300 |
| Evaluation Existence or non-existence of delamination | Die shoulder | Depth D: 3 mm | ○ | ○ | ○ | ○ | ○ | ○ | ○ | ○ |
|  | Rd 2 mm | Depth D: 5 mm | ○ | ○ | ○ | ○ | ○ | ○ | ○ | ○ |
|  | Die shoulder | Depth D: 3 mm | ○ | ○ | ○ | ○ | ○ | ○ | ○ | ○ |
|  | Rd 1 mm | Depth D: 5 mm | ○ | ○ | ○ | ○ | ○ | ○ | ○ | ○ |

|  |  |  |  |  | Comparative Example | | | | | |
|---|---|---|---|---|---|---|---|---|---|---|
|  |  |  |  |  | 1 | 2 | 3 | 4 | 5 | 6 |
| First adhesive agent layer (Two-part curing type polyester polyurethane resin) | Main ingredient (Polyester resin) | Dicarboxylic acid | Aliphatic (number of methylene) | | Azelaic acid (7) | Adipic acid (4) | | | Azelaic acid (7) | |
|  |  |  | Aromatic group | | | | Isophthalic acid | | | |
|  |  |  | Content rate of Aromatic group (Mol %) | | 70 | 30 | 90 | 70 | 70 | 70 |
|  |  | Dialcohol | Neopentylglycol (Mol %) | | 30 | 30 | 30 | 30 | 30 | 30 |
|  |  |  | Ethylene glycol (Mol %) | | 30 | 30 | 30 | 30 | 30 | 30 |
|  |  |  | Hexanediol (Mol %) | | 40 | 40 | 40 | 40 | 40 | 40 |
|  |  | Molecular weight | Number average molecular weight | | 12,000 | 12,000 | 12,000 | 6,700 | 26,000 | 12,000 |
|  |  |  | Weight average molecular weight | | 20,500 | 20,500 | 20,500 | 8,400 | 66,000 | 20,500 |
|  |  |  | Mw/Mn | | 1.71 | 1.71 | 1.71 | 1.25 | 2.54 | 1.71 |
|  | Curing agent | Type of Isocyanate compound | | | TDI | TDI | TDI | TDI | TDI | Aliphatic |
|  |  | Ration of aromatic group | | | 100% | 100% | 100% | 100% | 100% | |
|  | Molar ratio | | | | 10 | 10 | 10 | 4 | 23 | 10 |
| Young's modulus (MPa) of Hardened film | | | | | 40 | 50 | 520 | 45 | 55 | 25 |
| Evaluation Existence or non-existence of delamination | Die shoulder | Depth D: 3 mm | | | ○ | ○ | ○ | ○ | ○ | x |
|  | Rd 2 mm | Depth D: 5 mm | | | ○ | ○ | x | ○ | ○ | x |
|  | Die shoulder | Depth D: 3 mm | | | x | ○ | x | ○ | x | x |
|  | Rd 1 mm | Depth D: 5 mm | | | x | x | x | x | x | x |

As will be apparent from Table 1, in the molding packaging materials of Examples 1 to 8 according to the present invention, even under the high temperature environment after molding, the thermoplastic resin layer-resistant was never detached. On the other hand, in Comparative Examples in which the adhesive agent composition deviated from the scope of the present invention, detachment occurred.

The present invention claims priority to Japanese Patent Application No. 2013-126577 filed on Jun. 17, 2013 and Japanese Patent Application No. 2014-67677 filed on Mar. 28, 2014, the entire disclosure of which is incorporated herein by reference in its entirety.

The terms and descriptions used herein are used only for explanatory purposes and the present invention is not limited to them. The present invention allows various design-changes falling within the claimed scope of the present invention unless it deviates from the spirits of the invention.

INDUSTRIAL APPLICABILITY

The molding packaging material of some specific embodiments of the present invention can be preferably used as a case for stationary type lithium ion secondary batteries or lithium ion secondary batteries for use in, e.g., laptops, mobile phones, or automobiles, and also preferably used as a packaging material for, e.g., food products or pharmaceutical products, but not specifically limited to such usage. Among other things, it can be especially preferably used as a battery case.

EXPLANATION OF SYMBOLS 1, 10 . . . Molding packaging material
2 . . . Heat resistant resin layer (outer layer)
3 . . . Thermoplastic resin layer (inner layer)
4 . . . Metal foil layer (aluminum foil)
5 . . . First adhesive agent layer
6 . . . Second adhesive agent layer
11a, 11b . . . Chemical conversion coating film
20 . . . Molded case (battery case)
23 . . . Shoulder region
30 . . . Die
R . . . Radius of curvature of the shoulder region
D . . . Forming depth

The invention claimed is:
1. A molding packaging material, comprising:
a heat resistant resin layer as an outer layer;
a metal foil layer; and
a first adhesive agent layer arranged between the heat resistant resin layer and the metal foil layer,
wherein the first adhesive agent layer is constituted by an adhesive agent containing a two-part curing type poly- ester polyurethane resin made of a polyester resin as a main ingredient and a multifunctional isocyanate compound as a curing agent, wherein the polyester resin is made from dicarboxylic acid and dialcohol, the dicarboxylic acid contains aliphatic carboxylic acid whose number of methylene of a methylene chain is an even number and aromatic carboxylic acid, and a content rate of the aromatic carboxylic acid to a total amount of aliphatic carboxylic acid and aromatic carboxylic acid is 40 to 80 mol %, and wherein the polyester resin is 8,000-25,000 in number average molecular weight (Mn) and 15,000 to 50,000 in weight average molecular weight (Mw), and a ratio thereof (Mw/Mn) is 1.3 to 2.5.

2. The molding packaging material as recited in claim 1, wherein the two-part curing type polyester polyurethane resin contains the main ingredient and the curing agent at a rate of 2 to 25 mole of isocyanate functional group (—NCO) to 1 mole of polyol hydroxyl group (—OH).

3. The molding packaging material as recited in claim 1, wherein the two-part curing type polyester polyurethane resin is 70 to 400 MPa in Young's modulus by a tensile test (JIS K7162) of a cured film obtained after reacting the main ingredient and the curing agent.

4. The molding packaging material as recited in claim 1, wherein the multifunctional isocyanate compound as the curing agent contains 50 mol % or more of aromatic isocyanate.

5. The molding packaging material as recited in claim 1, further comprising:
a thermoplastic resin layer as an inner layer; and
a second adhesive agent layer arranged between the metal foil layer and the thermoplastic resin layer,
wherein a chemical conversion coating film is provided on at least one surface of the metal foil layer.

6. A molded case comprising:
a concave case main body having an opening periphery; and
a flange continuously formed on the opening periphery of the concave case main body,
wherein the concave case main body and the flange are formed by drawing or bulging a molding packaging material,
wherein the molding packaging material includes:
a heat resistant resin layer as an outer layer;
a metal foil layer; and
a first adhesive agent layer arranged between the heat resistant resin layer and the metal foil layer,
wherein the first adhesive agent layer is constituted by an adhesive agent containing a two-part curing type polyester polyurethane resin made of a polyester resin as a main ingredient and a multifunctional isocyanate compound as a curing agent,
wherein the polyester resins is made from dicarboxylic acid and dialcohol, the dicarboxylic acid contains aliphatic carboxylic acid and aromatic carboxylic acid whose number of methylene of a methylene chain is an even number, and a content rate of the aromatic carboxylic acid to a total amount of aliphatic carboxylic acid and aromatic carboxylic acid is 40 to 80 mol %, and
wherein the polyester resin is 8,000 to 25,000 in number average molecular weight (Mn) and 15,000 to 50,000 in weight average molecular weight (Mw), and a ratio thereof (Mw/Mn) is 1.3 to 2.5.

7. The molded case as recited in claim 6, wherein the molded case is used as a battery case.

8. The molded case as recited in claim 6, wherein a forming depth of the case main body is 3 mm or more, and a radius of curvature R of a shoulder region formed by a side wall of the case main body and the flange is 2 mm or less.

* * * * *